(12) United States Patent
Yang

(10) Patent No.: US 12,655,873 B2
(45) Date of Patent: Jun. 16, 2026

(54) BEARING WITH ANTI-CORROSION FUNCTION

(71) Applicant: HYUNDAI MOBIS CO., LTD., Seoul (KR)

(72) Inventor: Hae Jun Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 253 days.

(21) Appl. No.: 18/675,740

(22) Filed: May 28, 2024

(65) Prior Publication Data

US 2025/0075744 A1 Mar. 6, 2025

(30) Foreign Application Priority Data

Sep. 5, 2023 (KR) ........................ 10-2023-0117792

(51) Int. Cl.
*F16C 41/00* (2006.01)
(52) U.S. Cl.
CPC ........ *F16C 41/002* (2013.01); *F16C 2226/12* (2013.01); *F16C 2380/26* (2013.01)

(58) Field of Classification Search
CPC .......... H02K 5/16; H02K 7/08; F16C 41/002; H01R 39/38
USPC ............................................. 310/90
See application file for complete search history.

(56) References Cited

U.S. PATENT DOCUMENTS

2018/0083515 A1* 3/2018 Graves .................... H02K 9/193

FOREIGN PATENT DOCUMENTS

KR 10-2444892 B1 9/2022

* cited by examiner

*Primary Examiner* — Terrance L Kenerly
*Assistant Examiner* — Theodore L Perkins
(74) *Attorney, Agent, or Firm* — Morgan, Lewis & Bockius LLP

(57) ABSTRACT

A bearing fitted to a motor shaft for an anti-corrosion function may ensure lower material costs and weight by adopting a smaller size compared to the prior art, and also ensure a significantly-reduced rotational frictional force, and be advantageous in terms of the noise, vibration, and harshness (NVH) of a vehicle as well by having a conductive seal formed in a brush type and in contact with an end cover and a rear cover in an axis direction.

10 Claims, 10 Drawing Sheets

[FIG. 1]
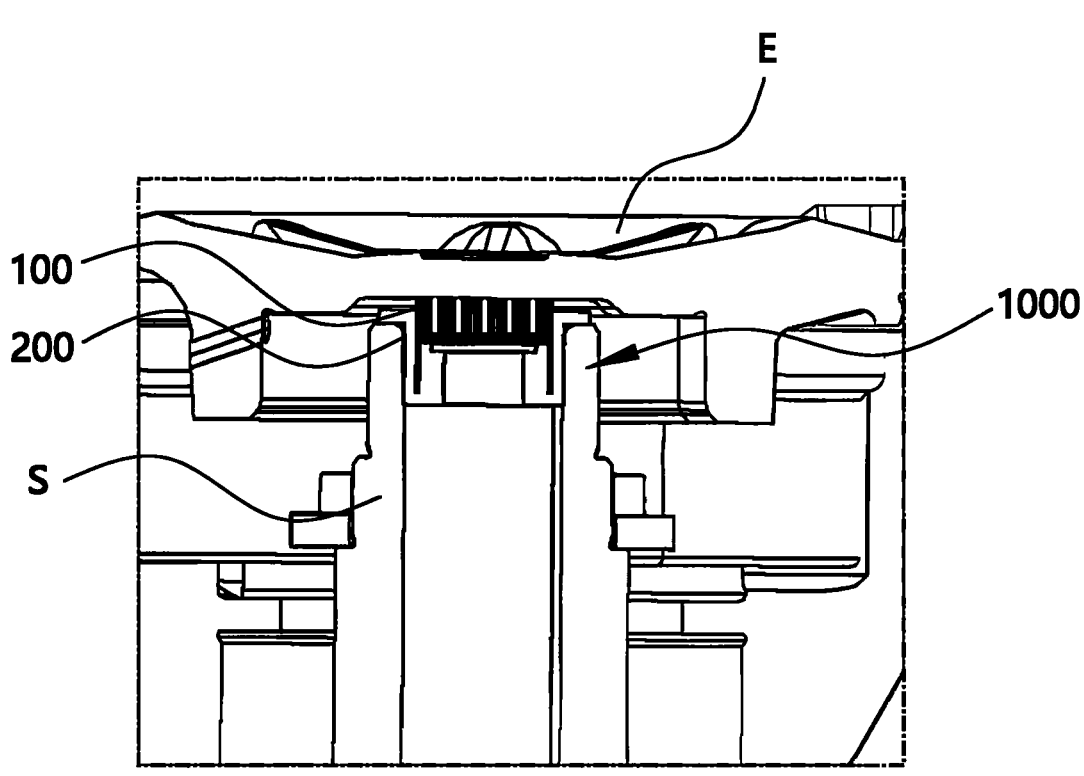

[FIG. 2]
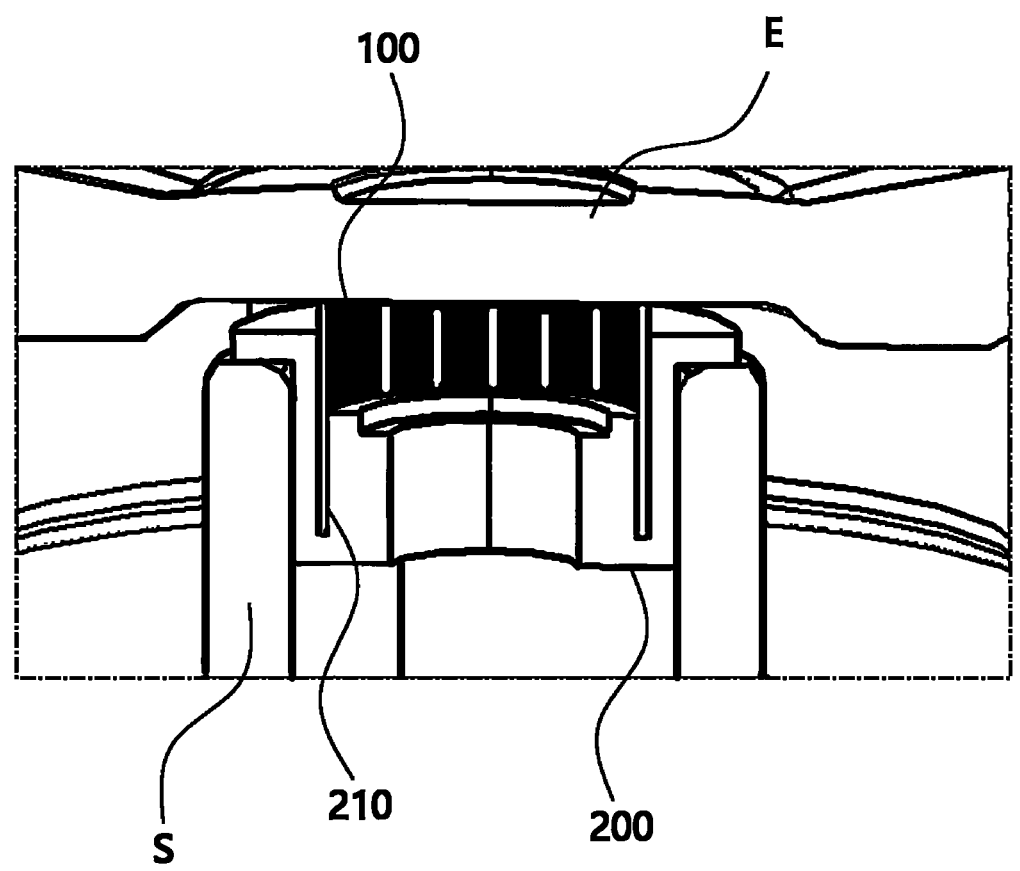

[FIG. 3]
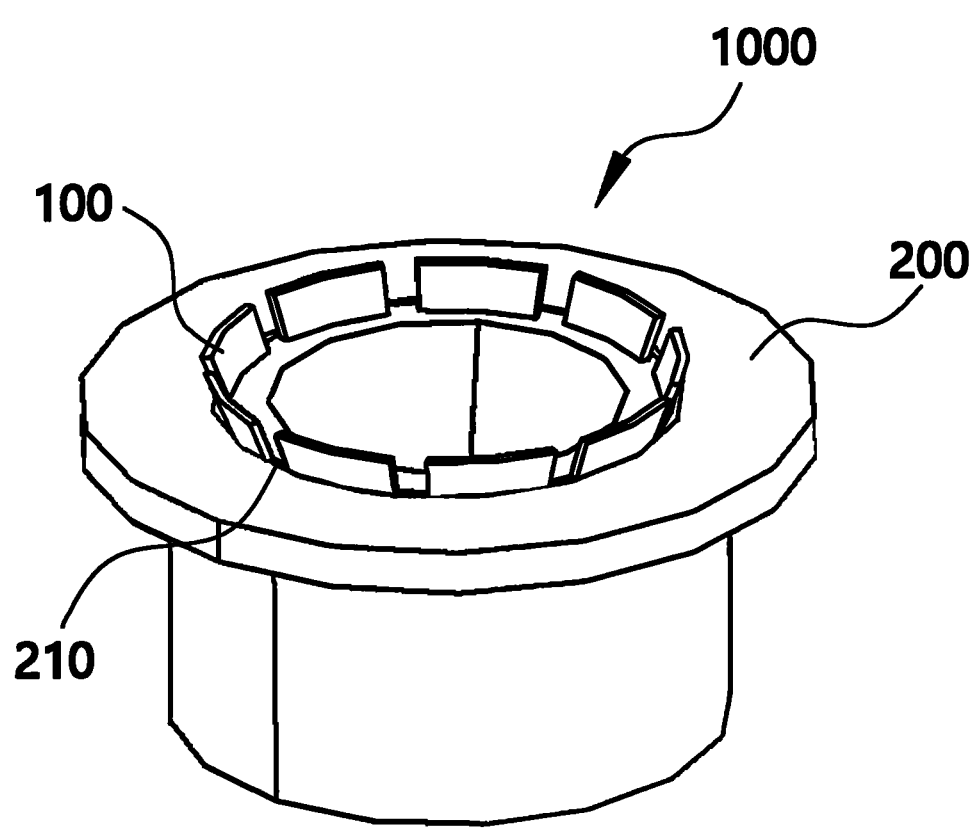

[FIG. 4]
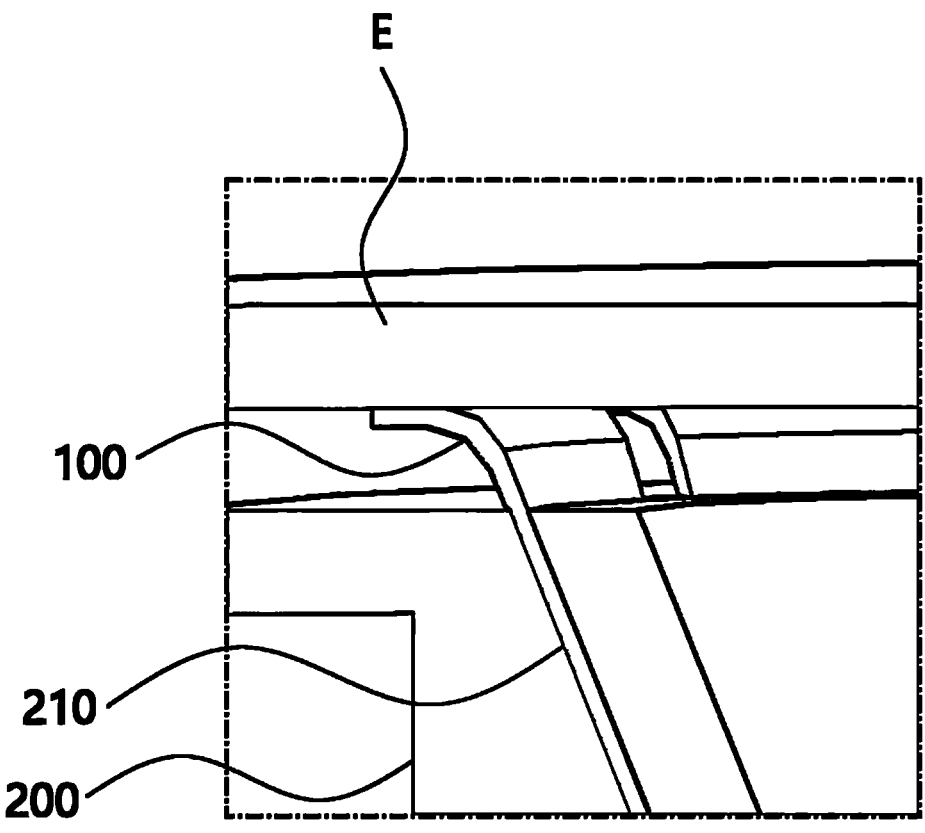

[FIG. 5]
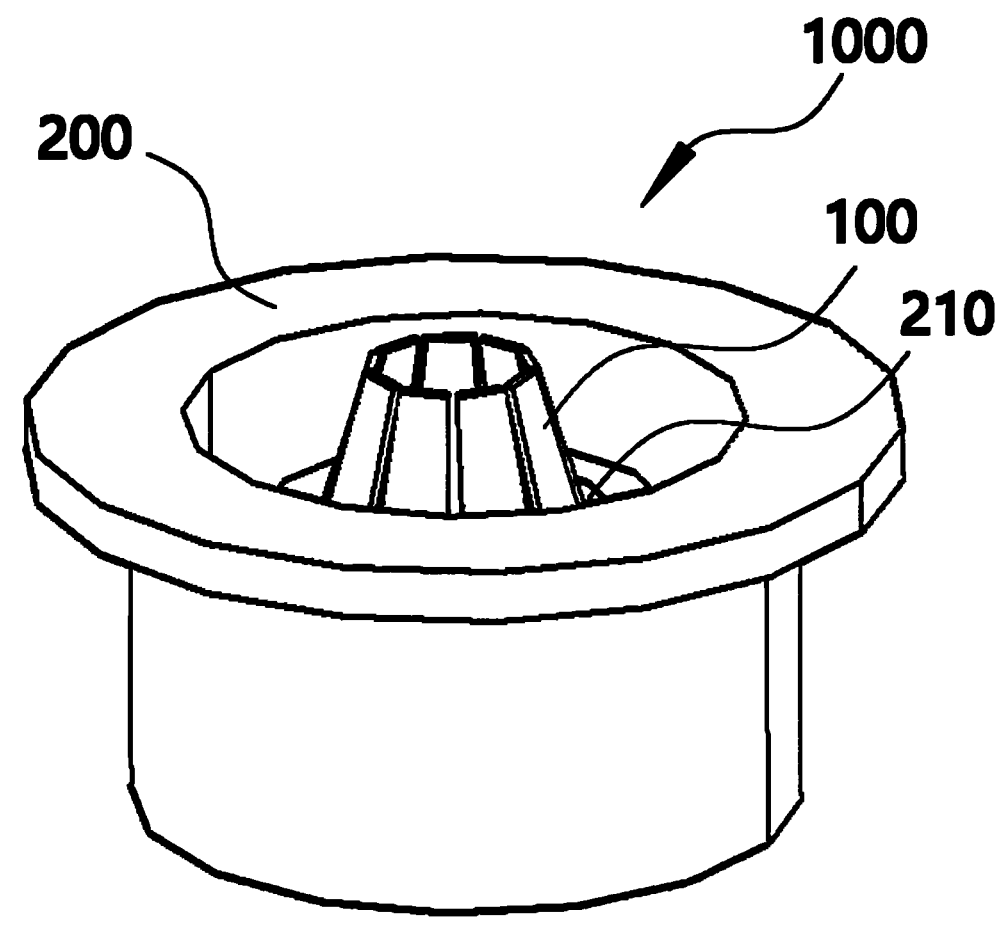

[FIG. 6]
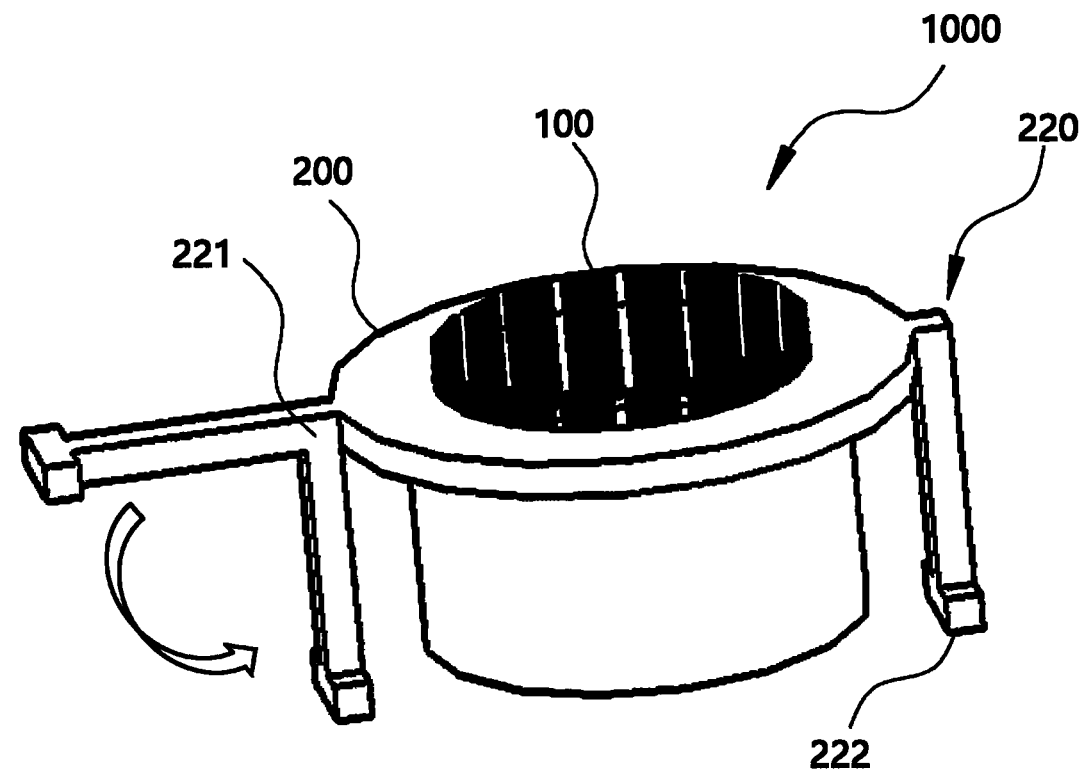

[FIG. 7]
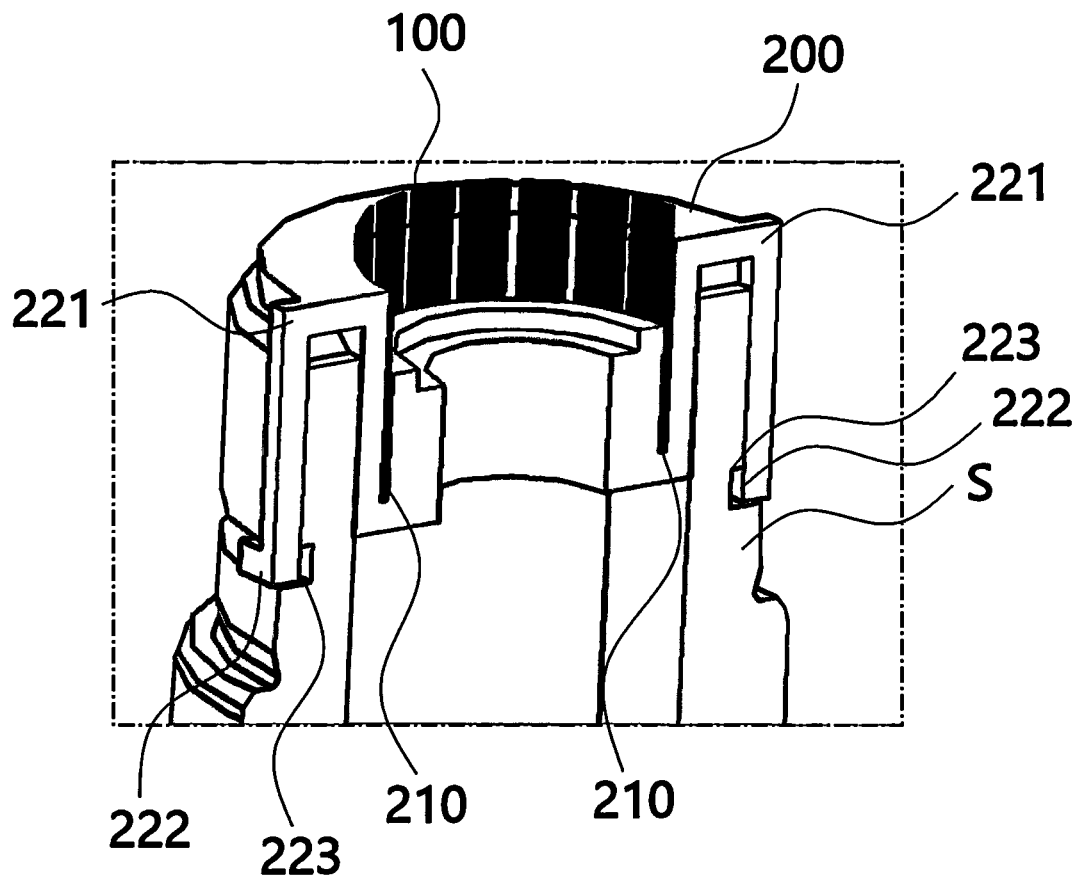

[FIG. 8]
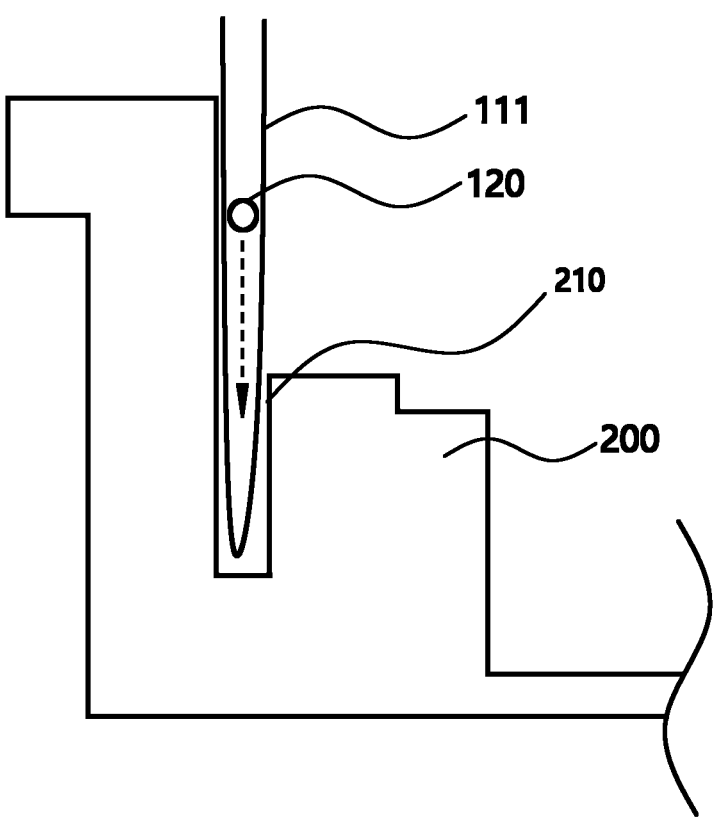

[FIG. 9]
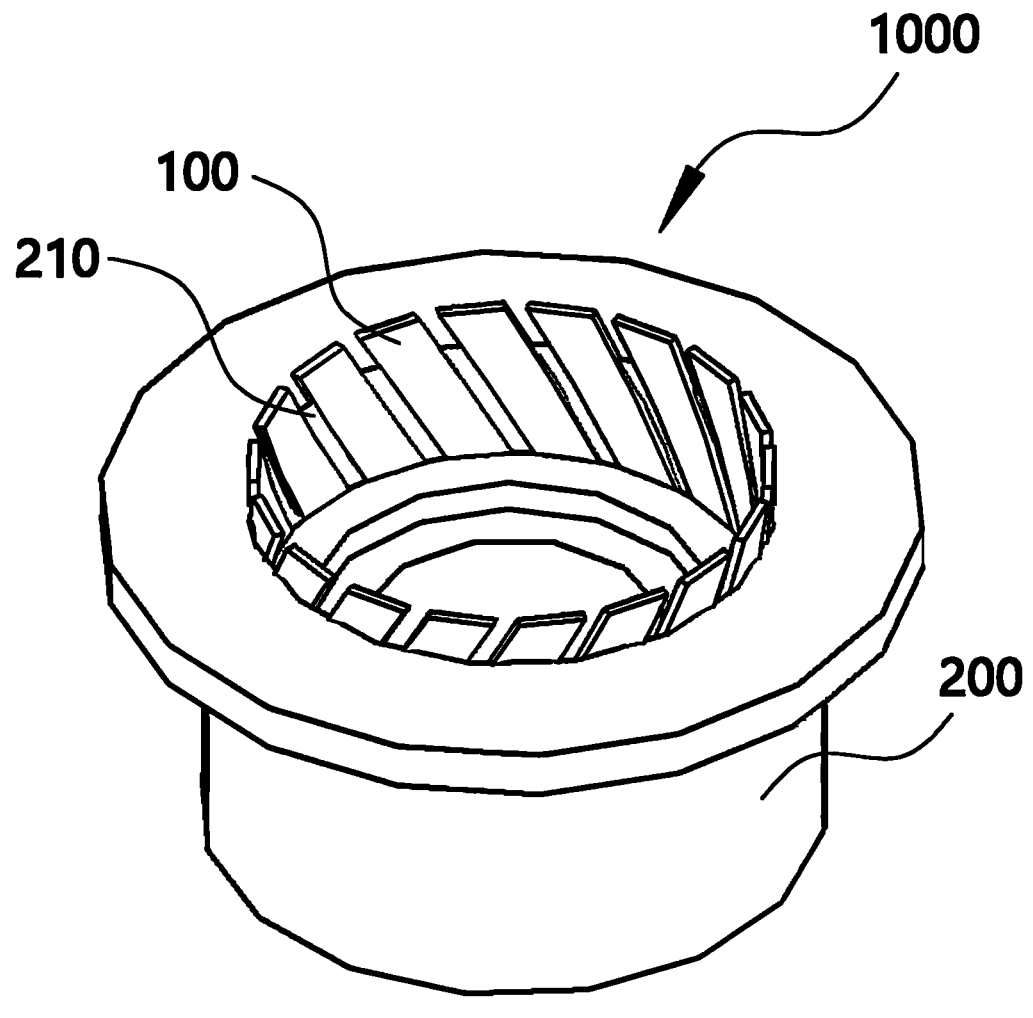

[FIG. 10]
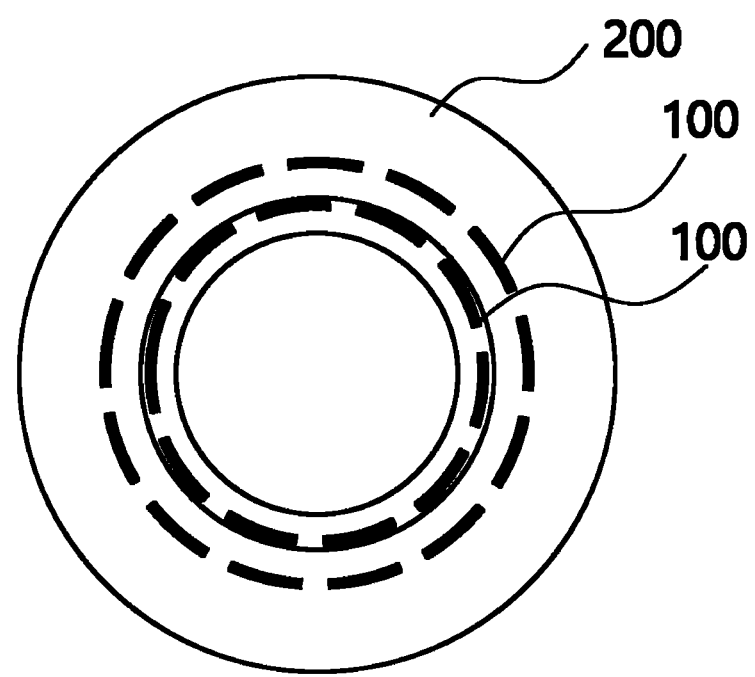

BEARING WITH ANTI-CORROSION FUNCTION

CROSS-REFERENCE TO RELATED APPLICATIONS

This application claims priority under 35 U.S.C. § 119 to Korean Patent Application No. 10-2023-0117792, filed on Sep. 5, 2023, in the Korean Intellectual Property Office, the disclosure of which is incorporated herein by reference in its entirety.

TECHNICAL FIELD

The following disclosure relates to a bearing, and more particularly, to a bearing fitted to a motor shaft.

BACKGROUND

A conventional drive system in a device for driving an electric vehicle applies a bearing anti-corrosion structure to a drive motor. The bearing anti-corrosion structure aims to prevent bearing corrosion caused by a parasitic current occurring in a drive motor shaft and improve vibration and noise caused by a load applied and transmitted to the drive motor shaft.

The prior art prevents a corrosion occurrence between a rotor shaft, an end cover, and a rear cover by fixedly-installing a shaft ground ring (SGR) to the end cover or the rear cover that is disposed at the front or rear of the drive motor, and connecting a conductive seal of the SGR to a rotation shaft of the drive motor.

However, the prior art adopts the SGR having an outer diameter press-fitted to the end cover and an inner diameter press-fitted to the shaft, thus causing a fast linear speed and a large rotational frictional force, which may result in damage to the SGR when used for a long time.

In addition, the prior art adopting the inner diameter of the shaft in contact with the outer diameter may have difficulty in lowering its material costs and weight due to the large SRG.

SUMMARY

An embodiment of the present disclosure is directed to providing a bearing with an anti-corrosion function that may ensure lower material costs and weight by adopting a smaller size compared to the prior art.

Another embodiment of the present disclosure is directed to providing a bearing with an anti-corrosion function that may ensure a significantly-reduced rotational frictional force and be advantageous in terms of noise, vibration, and harshness (NVH) of a vehicle as well by having a conductive seal formed in a brush type and in contact with an end cover and a rear cover in an axis direction.

Still another embodiment of the present disclosure is directed to providing a bearing with an anti-corrosion function that may ensure an improved function for a current flow by an increased contact area acquired by adjusting an angle of a conductive seal.

In one general aspect, provided is a bearing with an anti-corrosion function, the bearing including: a brush part including a plurality of brush strands; and a press-fit fixing part, to which a first end of the brush part is coupled, having an outer surface press-fit fixed to an inner surface of one end of a motor shaft, in which the brush part has the first end coupled to the press-fit fixing part and a second end in contact with an end cover of a motor, and the second end of the brush part extends externally from one end of the press-fit fixing part such that the end cover and the one end of the motor shaft are spaced apart from each other by a predetermined distance.

The press-fit fixing part may include a brush press-fit groove formed inwardly in one surface of the press-fit fixing part that faces the end cover.

The brush press-fit groove may be formed in a shape of a circle drawn around a rotation axis of the motor shaft, and a radial distance from the brush press-fit groove to the rotation axis decreases as the groove goes inward from the one surface of the press-fit fixing part.

The brush press-fit groove may be formed in a shape of a circle drawn around a rotation axis of the motor shaft, and a radial distance from the brush press-fit groove to the rotation axis increases as the groove goes inward from the one surface of the press-fit fixing part.

The bearing may further include a bending fixing part extending from the one end of the press-fit fixing part in a radial direction, in which the bending fixing part includes a bent part bent when a force is applied to its connection portion with the press-fit fixing part, and a fixed step protruding from an extending end of the bending fixing part, and an insertion groove may be concavely formed in an outer surface of the motor shaft and coupled to the fixed step.

Each brush strand may include a bent portion that is bent into a U shape, and the brush part may include a ring member press-fitted into the brush press-fit groove while being fitted onto the bent part of the brush strand.

The brush strand may have the first end coupled to a predetermined position of the brush press-fit groove, and the second end biased in one rotation direction compared to the first end of the brush strand.

The brush part may include at least one brush assembly in which the plurality of brush strands are polymerized, the second end of each of some brush strands included in the brush assembly may be biased in the one rotation direction compared to the first end of the corresponding brush strand, and the second end of each of remaining brush strands included in the brush assembly may be biased in an opposite rotation direction to the one rotation direction, compared to the first end of the corresponding brush strand.

The plurality of brush strands may be arranged in two or more rows in a radial direction, and brush strands disposed in a closer row to the rotation axis of the motor shaft, among the plurality of brush strands arranged in two or more rows in the radial direction, may be made of a material having a higher wear degree and higher electrical conductivity at the same load.

The brush strands may have a greater length extending outwardly in axis direction as the press-fit fixing part is farther from the rotation axis of the motor shaft.

Other features and aspects will be apparent from the following detailed description, the drawings, and the claims.

BRIEF DESCRIPTION OF THE DRAWINGS

FIG. 1 is a partial cross-sectional view of a motor using a bearing with an anti-corrosion function according to the present disclosure.

FIG. 2 is a cross-sectional view of the bearing with the anti-corrosion function according to the present disclosure.

FIG. 3 is a perspective view showing the bearing with the anti-corrosion function when using a first embodiment of a brush press-fit groove according to the present disclosure.

FIG. 4 is a partial cross-sectional view of the motor when using the first embodiment of the brush press-fit groove according to the present disclosure.

FIG. 5 is a perspective view showing the bearing with the anti-corrosion function when using a second embodiment of the brush press-fit groove according to the present disclosure.

FIG. 6 is a conceptual view showing a bending fixing part of the present disclosure.

FIG. 7 is a cross-sectional view of the bearing with the anti-corrosion function that uses the bending fixing part according to the present disclosure.

FIG. 8 is a partial cross-sectional view showing a first embodiment of a brush part according to the present disclosure.

FIG. 9 is a perspective view showing a second embodiment of the brush part according to the present disclosure.

FIG. 10 is a top view showing a third embodiment of the brush part according to the present disclosure.

DETAILED DESCRIPTION OF EMBODIMENTS

Hereinafter, the technical spirit of the present disclosure is described in more detail with reference to the accompanying drawings. Prior to the description, terms and words used in the specification and claims are not to be construed as general or dictionary meanings, and are to be construed as meanings and concepts meeting the spirit of the present disclosure based on a principle in which the inventors may appropriately define the concepts of the terms in order to describe their inventions in the best mode.

Hereinafter, the description describes a basic configuration of a bearing 1000 with an anti-corrosion function of the present disclosure with reference to FIGS. 1 and 2.

As shown in FIG. 1, the bearing 1000 with the anti-corrosion function of the present disclosure may include a brush part 100 including a plurality of brush strands 110. The brush part 100 may serve as a conductive seal and may be made of electrically conductive material. Here, the brush part 100 may have one end coupled to a press-fit fixing part 200, and the other end in contact with an end cover E of a motor, and extending externally to the other side of the press-fit fixing part 200 to thus allow the end cover E and one end of a shaft S to be spaced apart from each other by a predetermined distance. Accordingly, an electric field may be induced to be moved toward the end cover E along the brush part 100, thus preventing corrosion from occurring in the bearing 1000 with the anti-corrosion function.

In addition, the bearing 1000 with the anti-corrosion function of the present disclosure may include the press-fit fixing part 200. The press-fit fixing part 200 may be coupled to one end of the brush part 100, and press-fit fixed to an inner surface of one end of the motor shaft S. In addition, as shown in FIG. 2, the press-fit fixing part 200 of the bearing 1000 with the anti-corrosion function may include a brush press-fit groove 210 formed inward in one surface of the press-fit fixing part 200 that faces the end cover E. The brush press-fit groove 210 may be formed by considering a thickness of the brush strand 110. As described above, the bearing 1000 with the anti-corrosion function may be fitted into the shaft S. As a result, the present disclosure may provide the same performance with a smaller size compared to the prior art, thereby lowering the material costs and weight of the bearing 1000 with the anti-corrosion function. In addition, due to the smaller size, the bearing 1000 with the anti-corrosion function may have a reduced rotational frictional force, which may be advantageous in terms of the noise, vibration, and harshness (NVH) of a vehicle.

Hereinafter, the description describes an embodiment of the brush press-fit groove 210 of the bearing 1000 with the anti-corrosion function according to the present disclosure in more detail with reference to FIGS. 3 to 5.

In a first embodiment of the brush press-fit groove 210 that is shown in FIG. 3, the brush press-fit groove 210 may be formed in a shape of a circle drawn around a rotation axis of the shaft S, and may be closer to the rotation axis as the groove 210 goes inward from one surface of the press-fit fixing part 200. In addition, the brush part 100 may have one end fixed to the brush groove of the press-fit fixing part 200, and the other end extending externally from the press-fit fixing part 200 and the shaft S to be in contact with the end cover E. Accordingly, the brush part 100 may be disposed while expanding toward the end cover E.

Here, the brush part 100 may be made of a material allowing the brush part 100 to be sufficiently bent by a force for fixing positions of the end cover E and the shaft S. As shown in FIG. 4, the brush part 100 may be bent outward in a radial direction to have a constant surface in contact with the end cover E. Accordingly, the electric field may be induced to be moved toward the end cover E along the brush part 100.

In addition, in a second embodiment of the brush press-fit groove 210 that is shown in FIGS. 5, the brush press-fit groove 210 may be formed in the shape of a circle drawn around the rotation axis of the shaft S, and may be farther from the rotation axis as the groove 210 goes inward from one surface of the press-fit fixing part 200. Accordingly, the brush part 100 may be disposed while gathering toward the end cover E. By adopting this shape in the second embodiment, the present disclosure may reduce a rotational linear speed of the brush part 100 when the shaft S is rotated, and minimize wear of the brush, thus enabling its long-term use.

Hereinafter, the description describes a bending fixing part of the bearing 1000 with the anti-corrosion function according to the present disclosure in more detail with reference to FIGS. 6 and 7.

As shown in FIG. 6, the bearing 1000 with the anti-corrosion function of the present disclosure may further include a bending fixing part 220 extending from one end of the press-fit fixing part 200 in the radial direction. The bending fixing part 220 may include a bent part 221 bent when a force is applied to its connection portion with the press-fit fixing part 200. The bending fixing part 220 may be formed integrally with the press-fit fixing part 200, and each of the bending fixing part 220 and the press-fit fixing part 200 may be made of a steel. As the bending fixing part 220 is made of the steel, the bending fixing part 220 may be easily bent based on a user's intention, depending on a thickness of the bending fixing part 220, and may not return to its original state when no external force is applied thereto.

In addition, as shown in FIG. 7, the bending fixing part may include a fixed step 222 protruding from its extending end and an insertion groove 223 concavely formed in an outer surface of the shaft S and coupled to the fixed step 222. Accordingly, the bending fixing part may be coupled to the outer surface of the shaft S, and ultimately allowing the bearing 1000 with the anti-corrosion function of the present disclosure to be double coupled to the inside (i.e., the press-fit fixing part 200) and outside (i.e., the bending fixing part 220) of the shaft S, thereby increasing a coupling force between the bearing 1000 with the anti-corrosion function and the shaft S.

Further, the bearing 1000 with the anti-corrosion function of the present disclosure may include a bracket instead of the bending fixing part 220. In more detail, the bracket may be separate from the press-fit fixing part 200, and have one end inserted into the insertion groove 223 of the shaft S and the other end coupled to one surface of the press-fit fixing part 200. Accordingly, the bearing 1000 with the anti-corrosion function and the shaft S may be easily attached to and detached from each other.

Hereinafter, the description describes each embodiment of the brush part 100 of the present disclosure in more detail with reference to FIGS. 8 to 10.

In a first embodiment of the brush part 100 that is shown in FIG. 8, each brush strand 110 may be bent into a U shape, and the brush part 100 may include a ring member 120 press-fitted into the brush press-fit groove 210 while being fitted onto the bent part of the brush strand. Accordingly, the ring member 120 and the brush press-fit groove 210 may support the center of each brush strand 110, and may support the brush strand 110 not to be separated from the brush press-fit groove 210 even when the shaft S is rotated.

In addition, in a second embodiment of the brush part 100 that is shown in FIG. 9, the brush strand 110 may have one end coupled to a predetermined position of the brush press-fit groove 210, and the other end biased in one rotation direction compared to one end of the brush strand 110. That is, the brush strand 110 may have a Helix angle. Here, one rotation direction may be opposite to a main rotation direction of the shaft S, which is a clockwise direction. That is, one rotation direction may be a counterclockwise direction. It is thus possible to minimize friction occurring between the brush strand 110 and the end cover E when the shaft S is rotated, thereby preventing the brush strand 110 from being separated from the brush press-fit groove 210.

Furthermore, the brush part 100 in the second embodiment may include at least one brush assembly in which the plurality of brush strands 110 are polymerized. Some brush strands 110 included in the brush assembly may each include the other end biased in one rotation direction compared to one end of the brush strand, and each of the remaining brush strands 110 included in the brush assembly may include the other end biased in the other rotation direction compared to one end of the brush strand.

In more detail, A:B refers to a ratio of a probability that the motor shaft S is rotated in one rotation direction to a probability that the motor shaft S is rotated in the other rotation direction. Here, A:B may also preferably refer to a ratio of a probability that the brush strand 110 included in one brush assembly is biased in the other rotation direction to a probability that the brush strand 110 included in one brush assembly is biased in one rotation direction. Accordingly, the corresponding brush strands 110 may each be disposed in the brush assembly at a predetermined ratio even when the motor shaft S is rotated in both of one rotation direction and the other rotation direction, thereby preventing the brush strand 110 from being separated from the brush press-fit groove 210 due to the friction occurring between the end cover E and a resulting lower anti-corrosion performance.

In addition, as shown in FIG. 10, in a third embodiment of the brush part 100, the plurality of brush strands 110 may be arranged in two or more rows in the radial direction. Here, the brush strand 110 may be made of a material having a higher degree of wear and higher electrical conductivity at the same load as the brush strand 110 is closer to the rotation axis of the shaft S. The reason is that as the brush strand 110 is farther from the rotation axis of the shaft S, the brush strand 110 may have an increasing linear speed of the rotation, an increasing frictional force, and a lower probability that the electric field is moved. In this way, the material of the brush strand 110 in each row may be different depending on its distance from the rotation axis of the shaft S, thereby maintaining a more stable system, and inducing the electric field more smoothly through the brush part 100 and the end cover E.

Furthermore, the brush strand 110 in the third embodiment may preferably have a greater length extending outward in axis direction as the press-fit fixing part 200 is farther from the rotation axis of the shaft S. It is thus possible to induce the contact area between the brush part 100 and the end cover E to be wider as the brush strand 110 goes to an outer row farther from the rotation axis of the shaft S, and induce the electric field having a certain value or more to be moved in all the rows included in the brush part 100, thereby maximizing the anti-corrosion performance.

As set forth above, the bearing with the anti-corrosion function of the present disclosure may ensure the lower material costs and weight by adopting the smaller size compared to the prior art.

The bearing with the anti-corrosion function of the present disclosure may also ensure the significantly-reduced rotational frictional force, and be advantageous in terms of the noise, vibration, and harshness (NVH) of the vehicle as well by having the conductive seal formed in the brush type to be in contact with the end cover and the rear cover in the axis direction.

The bearing with the anti-corrosion function of the present disclosure may also ensure the improved function for the current flow by the increased contact area acquired by adjusting the angle of the conductive seal.

The spirit of the present disclosure should not be interpreted as being limited to the embodiments described above. The present disclosure may be applied to various fields and may be variously modified by those skilled in the art without departing from the scope of the present disclosure claimed in the claims. Therefore, the bearing 1000 with the anti-corrosion function and its modifications may fall within the scope of the present disclosure as long as the bearing and its modifications are obvious to those skilled in the art.

What is claimed is:

1. A bearing with an anti-corrosion function, the bearing comprising:
   a brush part including a plurality of brush strands; and
   a press-fit fixing part, to which a first end of the brush part is coupled, having an outer surface being press-fit fixed to an inner surface of one end of a motor shaft,
   wherein the brush part has the first end coupled to the press-fit fixing part and a second end in contact with an end cover of a motor, and
   the second end of the brush part extends externally from one end of the press-fit fixing part such that the end cover and the one end of the motor shaft are spaced apart from each other by a predetermined distance.

2. The bearing of claim 1, wherein the press-fit fixing part includes a brush press-fit groove formed inwardly in one surface of the press-fit fixing part that faces the end cover.

3. The bearing of claim 2, wherein the brush press-fit groove is formed in a shape of a circle drawn around a rotation axis of the motor shaft, and a radial distance from the brush press-fit groove to the rotation axis decreases as the brush press-fit groove goes inward from the one surface of the press-fit fixing part.

4. The bearing of claim 2, wherein the brush press-fit groove is formed in a shape of a circle drawn around a rotation axis of the motor shaft, and a radial distance from the brush press-fit groove to the rotation axis increases as the groove goes inward from the one surface of the press-fit fixing part.

5. The bearing of claim 1, further comprising a bending fixing part extending from the one end of the press-fit fixing part in a radial direction, wherein the bending fixing part includes:

a bent part bent when a force is applied to its connection portion with the press-fit fixing part; and a fixed step protruding from an extending end of the bending fixing part, and wherein an insertion groove is concavely formed in an outer surface of the motor shaft and coupled to the fixed step.

6. The bearing of claim 2, wherein each brush strand includes a bent part that is bent into a U shape, and the brush part includes a ring member press-fitted into the brush press-fit groove while being fitted onto the bent part of the brush strand.

7. The bearing of claim 2, wherein the brush strand has the first end coupled to a predetermined position of the brush press-fit groove, and the second end biased in one rotation direction compared to the first end of the brush strand.

8. The bearing of claim 7, wherein the brush part includes at least one brush assembly in which the plurality of brush strands are polymerized, the second end of each of some brush strands included in the brush assembly is biased in the one rotation direction compared to the first end of the corresponding brush strand, and the second end of each of remaining brush strands included in the brush assembly is biased in an opposite rotation direction to the one rotation direction, compared to the first end of the corresponding brush strand.

9. The bearing of claim 1, wherein the plurality of brush strands are arranged in two or more rows in a radial direction, and brush strands disposed in a closer row to the rotation axis of the motor shaft, among the plurality of brush strands arranged in two or more rows in the radial direction, are made of a material having a higher wear degree and higher electrical conductivity at the same load.

10. The bearing of claim 9, wherein the brush strands have a greater length extending outwardly in axis direction as the press-fit fixing part is farther from the rotation axis of the motor shaft.

* * * * *